United States Patent [19]

Coleman

[11] Patent Number: 4,770,578

[45] Date of Patent: Sep. 13, 1988

[54] ARRANGEMENT FOR SECURING BINS TO A FLATBED OF A RAILROAD FLAT CAR OR A TRUCK USING A TIE-DOWN FRAME

[75] Inventor: Clarence B. Coleman, Oakland, Calif.

[73] Assignee: Fabricated Metals, Inc., San Leandro, Calif.

[21] Appl. No.: 21,196

[22] Filed: Mar. 3, 1987

[51] Int. Cl.$^4$ .................. B60P 7/10; B61D 45/00
[52] U.S. Cl. ............................... 410/34; 410/79; 410/86; 410/99; 410/120
[58] Field of Search ..................... 410/31, 32, 34, 71, 410/72, 77, 78, 79, 85, 86, 96, 97, 99, 100, 120, 38, 41; 220/1.5; 206/509, 511, 512; 294/81.1

[56] References Cited

U.S. PATENT DOCUMENTS

| | | | |
|---|---|---|---|
| 1,676,638 | 7/1928 | Eastham | 410/34 |
| 2,494,004 | 1/1950 | Rydner et al. | 410/100 |
| 3,543,951 | 12/1970 | Marvin | 410/78 |
| 3,776,169 | 12/1973 | Strecker | 410/77 |
| 4,036,476 | 7/1977 | Douce et al. | 410/34 |
| 4,532,800 | 8/1985 | Coleman | 73/308 |

Primary Examiner—Carlton R. Croyle
Assistant Examiner—Leonard P. Walnoha
Attorney, Agent, or Firm—Jack M. Wiseman

[57] ABSTRACT

An arrangement for securing bins to a deck of a vehicle, which employs a tie-down frame. The tie-down frame includes longitudinally extending right angle members that extend along the outboard upper end edges of the bins and outboard transversely extending right angle end members that extend across the uppermost side edges of the outboard bins. Right angle members are fixed to the longitudinal members inwardly of the transverse end members to engage the outward corners of the intermediate bins. The tie-down frame also includes intermediate transversely extending channel-shaped members that extend along the top of the bins inwardly from the outboard transversely extending end members for receiving the tines of a fork lift truck to move the tie-down frame from place-to-place. The tie-down frame is placed along the top of the bins. Cables releasably secure the tie-down frame to the deck to prevent the bins from sliding along the deck.

14 Claims, 4 Drawing Sheets

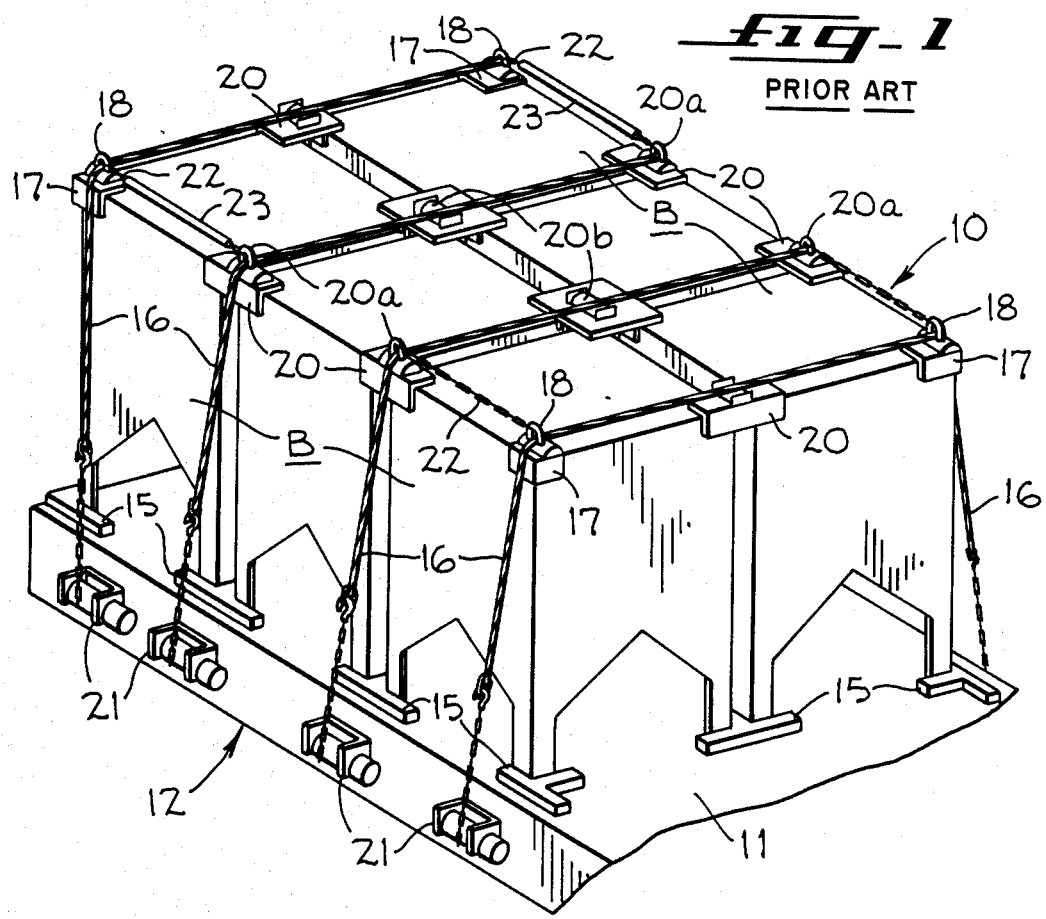
*fig_1*
PRIOR ART
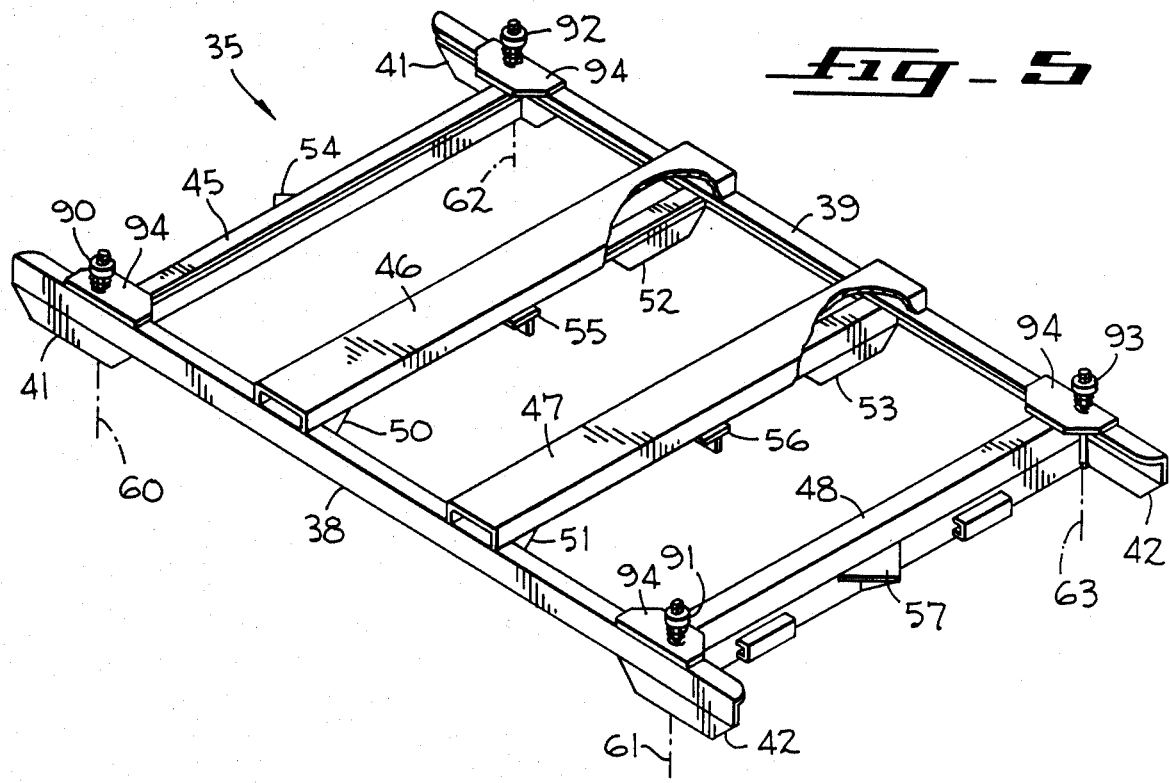
*fig_5*

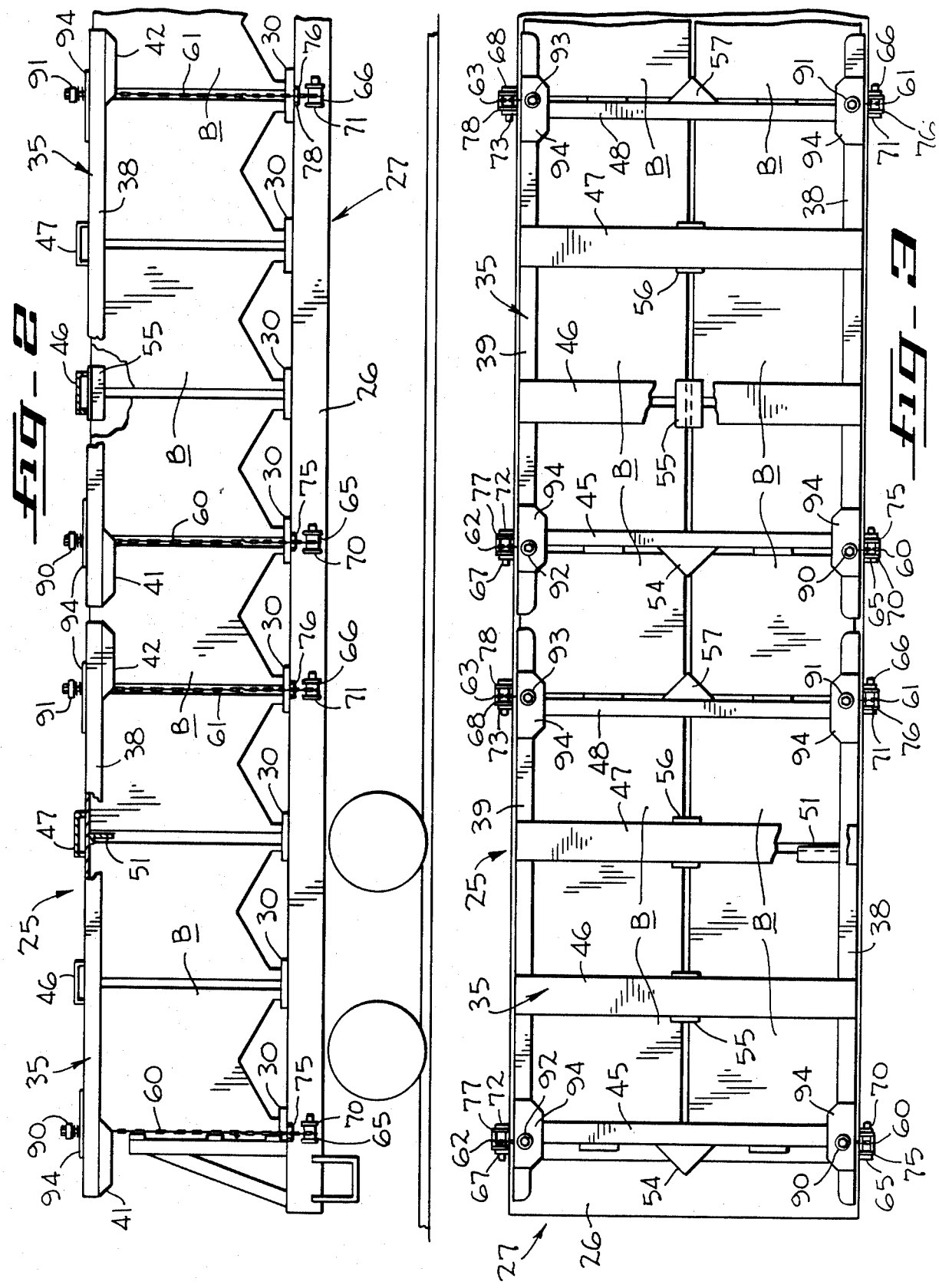

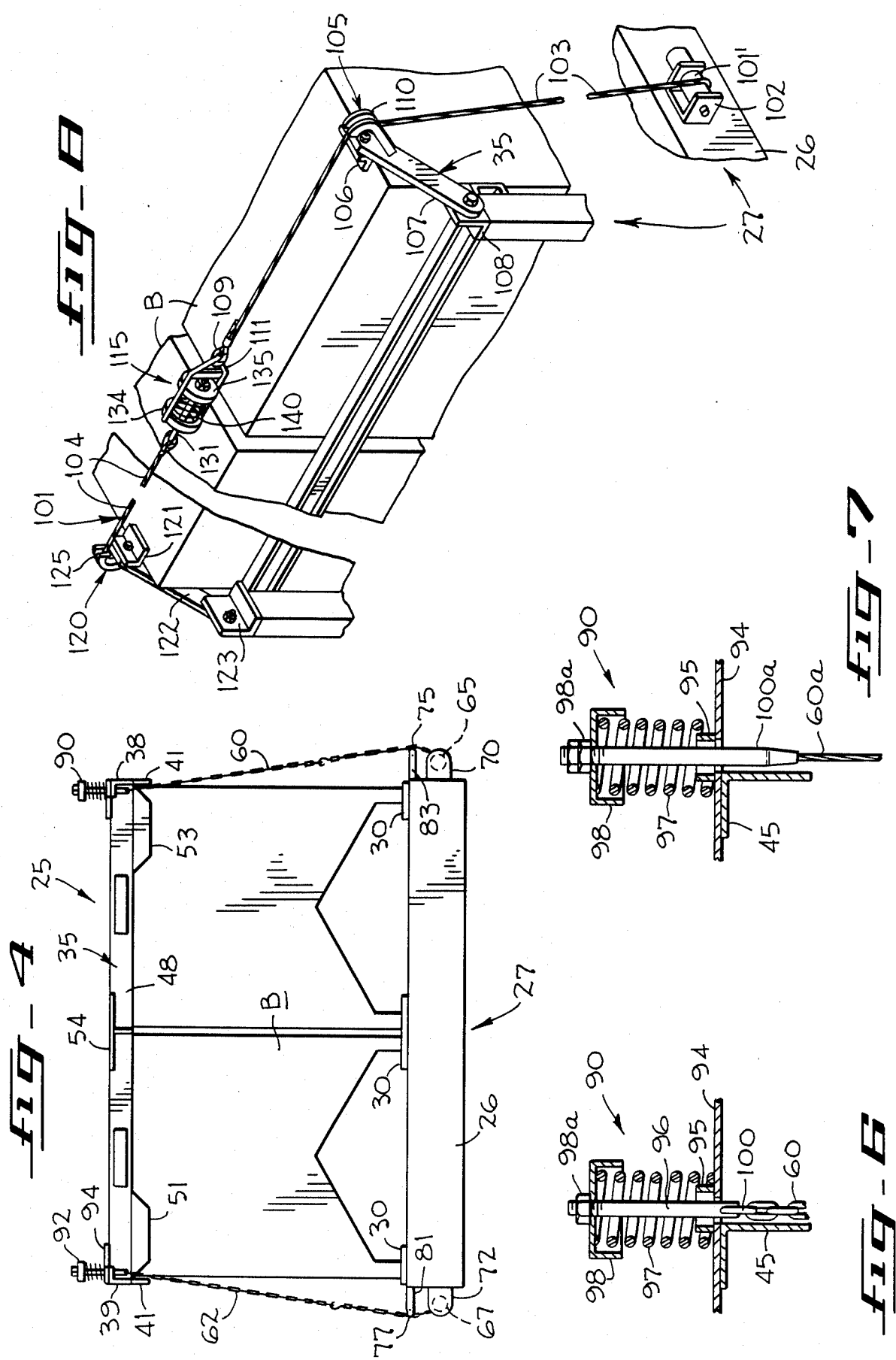

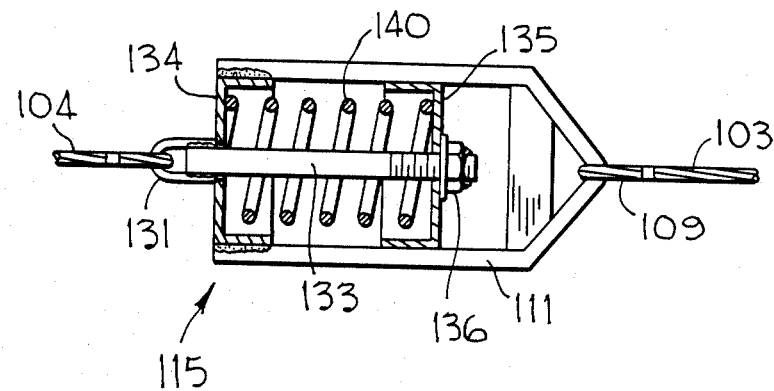
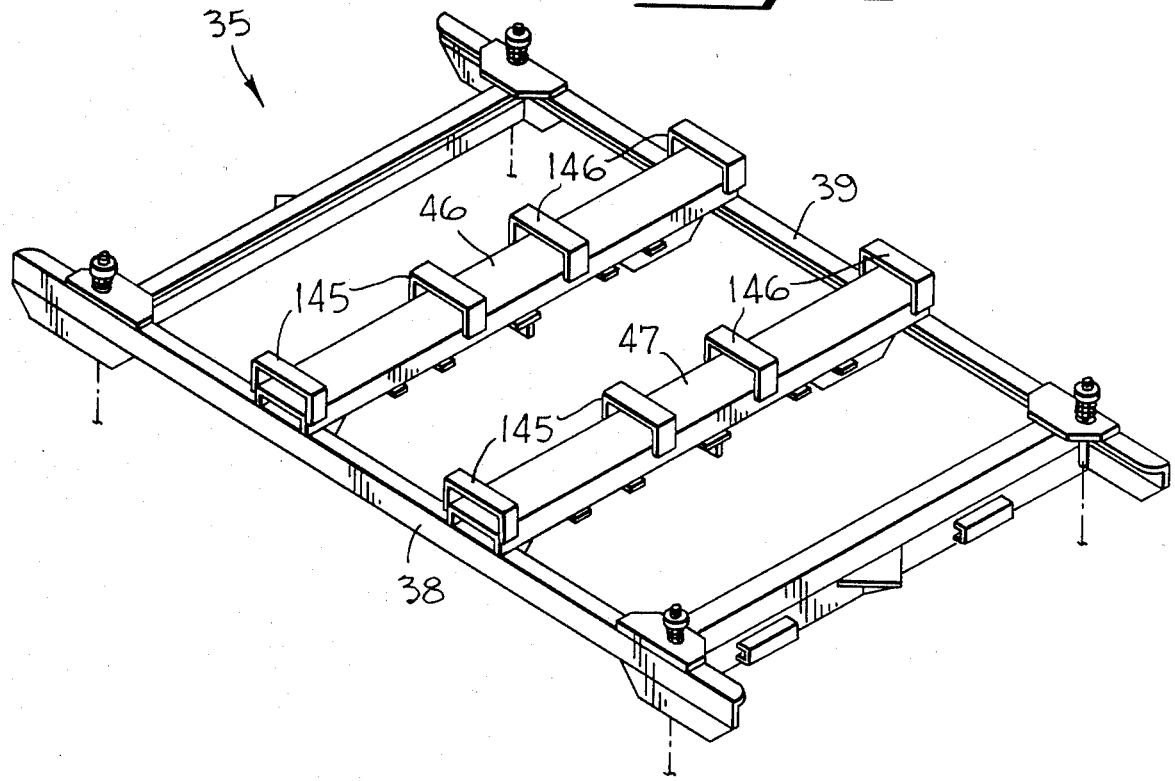

ARRANGEMENT FOR SECURING BINS TO A FLATBED OF A RAILROAD FLAT CAR OR A TRUCK USING A TIE-DOWN FRAME

BACKGROUND OF THE INVENTION

The present invention relates in general to an arrangement for securing bins to the flatbed or deck of a railroad flat car, gondola, boxcar, or a truck, and more particularly to an arrangement for securing bins to the flatbed or deck of a railroad flat car, gondola, boxcar or a truck using a tie-down frame.

Heretofore, bins were secured to the flatbed or a deck of a railroad flat car, gondola, boxcar or a truck by means of cables and clamps. Generally, the bins were aligned on a flatbed or deck longitudinally and also aligned transversely. Generally, there were two longitudinal rows of bins on a flatbed, although in some instances there may be a single row. At the outside upper corners of the end bins of each longitudinal row of bins extended a cable in the transverse direction. The ends of each end cable were releasably secured by winches to the flatbed or decks. The end cables intermediate the ends thereof secured corner clamps to the outside upper corners of the end bins of each longitudinal row of bins.

Adjacent upper corners of the bins, between the end bins, were secured by intermediate cables and adjoining clamps. The intermediate cables extended in the transverse direction. The free ends of the intermediate cables were releasably secured to the flatbed or decks by winches. Each adjoining clamp extended over adjacent upper corners of the bins. Safety chains extended respectively in the longitudinal direction between end bins. The winches were tightened to provide the proper forces to the cables for proper securement of the bins to the flatbed.

The bottom corners of the bins were placed against stops, which were fastened to the flatbed or deck of the railroad car or truck. Corner stops were fastened to the flatbed or deck at the outside lower corners of the end bins of each longitudinal row of bins. Adjoining stops were fastened to the flatbed or deck at adjacent lower corners of the intermediate bins. The stops were intended to inhibit the bins from sliding relative to the flatbed.

The forces on adjacent bins due to the movement of the railroad car or truck were not equally applied. Hence, the stresses exerted by one bin could be lesser or greater than the stresses applied to another bin. As a consequence thereof, there was cable or chain shifting. The cable or chain movement resulted in the breakage of the cable or chain, or the shifting of the tie-down, and the shifting of bins relative to the flatbed or deck.

SUMMARY OF THE INVENTION

An arrangement for securing bins to a flatbed or deck of a railroad flat car, gondola, boxcar or a truck, in which a tie-down frame is disposed on top of the bins. The tie-down frame comprises longitudinally extending angle members that extend respectively along the outboard upper end edges of the bins. The frame also includes transversely extending members that extend respectively across the upper side edges of the bins. Right angle members are fixed to the longitudinal members inwardly of the transverse end members to engage confronting corners of the intermediate bins.

A feature of the present invention is the employment of a bin tie-down frame for securing bins on a flatbed or deck of a railroad flat car, gondola, boxcar or truck to prevent bins from sliding along or rocking on the flatbed or deck.

Another feature of the present invention is the employment of a bin tie-down frame for securing bins on a flatbed or deck of a railroad flat car, gondola, boxcar or truck to provide equal force distribution between bins and the flatbed or deck to reduce tie-down chain or cable breakage.

Another feature of the present invention is the employment of a bin tie-down frame for securing bins on a flatbed or deck of a railroad flat car, gondola, boxcar, or truck in which the number of tie-down cables or chains required to secure the bins to the flatbed or deck is reduced.

An object of the present invention is the employment of a tie-down frame to secure bins on a flatbed or deck of a railroad flat car, gondola, boxcar, or truck for expediting the attachment, securing, and releasing of the bins to or from the flatbed or deck of a railroad flat car, gondola, boxcar, or truck.

BRIEF DESCRIPTION OF THE DRAWINGS

FIG. 1 is a perspective view of a prior art arrangement for securing bins to the flatbed of a railroad flat car.

FIG. 2 is a fragmentary side elevation view of an arrangement for securing bins to the flatbed of a railroad flat car embodying the present invention and broken away to illustrate bin retaining members.

FIG. 3 is a fragmentary plan view of the arrangement shown in FIG. 2 for securing bins to the flatbed of a railroad flat car embodying the present invention and broken away to illustrate a bin retaining member and a T-shaped spacer.

FIG. 4 is an end elevation view of the arrangement shown in FIGS. 2 and 3 for securing bins to the flatbed of a railroad flat car embodying the present invention.

FIG. 5 is a perspective view of a tie-down frame embodying the present invention employed in the arrangement shown in FIGS. 2–4 for securing bins to the flatbed of a railroad flat car broken away to illustrate bin retaining members.

FIG. 6 is an enlarged axial sectional view partially in elevation of a spring frame coupler employed in the arrangements shown in FIGS. 2–4.

FIG. 7 is an enlarged axial sectional view partially in elevation of a modification of the spring frame coupler shown in FIG. 6.

FIG. 8 is a fragmentary perspective view of a railroad flat car and an alternate cable arrangement for securing bins to the flatbed of the railroad flat car.

FIG. 8A is an enlarged front elevation view of an isolator assembly used in the cable arrangement shown in FIG. 8.

FIG. 9 is a perspective view of a modified channel member for the tie-down frame shown in FIG. 2–5.

DETAILED DESCRIPTION OF THE PREFERRED EMBODIMENT

Illustrated in FIG. 1 is an arrangement 10 for securing bins B to the flatbed 11 of a railroad car 12 employed prior to the present invention. Conventionally, bins B are loaded on a flatbed 11 in both longitudinal alignment and in transverse alignment. At each lower corner of each bin B is a stop 15 that may be removably secured to the flatbed 11 to hold the respective corners of the bins B in a fixed location and to prevent the bins B from sliding along the flatbed 11.

Extending transversely along the sides of the bins B are cables or chains 16. The chains or cables 16 are disposed in parallel relation. Along the corners at the top of the outboard bins B are corner caps 17. Associated chains or cables 16 advance through rigid loops 18 of the corner caps 17. Along the corners at the top of adjacent bins B are intermediate caps 20, which overlap adjacent corners of the bins B. Exterior intermediate caps 20 are formed with rigid loops 20a through which passes the associate chains or cables 16. Interior intermediate caps 20 are formed with suitable rods or rollers 20b over which the chains or cables are trained.

Each free end of a chain or cable 16 is attached to a suitable winch 21 so that the chains or cables 16 can be tightened for securing bins B to the flatbed 11 or can be loosened for the removal of the bins B from the flatbed 11. Extending longitudinally along the ends of the outboard bins B at the top thereof are safety cables or chains 22. The safety cables or chains 22 are attached to the rigid loops 18 of the corner caps 17 and the longitudinally spaced intermediate caps 20. Rubber hoses 23 surround selected ones of the safety cables or chains 22.

Illustrated in FIGS. 2-4 is an arrangement 25 for securing bins B to the flatbed 26 of a conventional railroad car 27 embodying the present invention. While reference herein is made to a flatbed, it is apparent that the term "deck" may also be applied. While reference herein is made to a railroad car, it is apparent that reference may be made to a truck. Typical railroad cars for the discussion herein may be a flatcar, a gondola, or a boxcar. Conventionally, bins B are loaded on the flatbed 26 in both longitudinal and in transverse alignment. At each lower corner of each bin B is a stop 30 similar to the stop 15 shown in FIG. 1 which can be removably secured to the flatbed 26 in a well-known manner. The stops 30 hold the respective lower corners of the bins B in a fixed location and prevent the bins B from sliding along the flatbed.

According to the present invention, a tie-down frame 35 (FIGS. 2-5) is disposed along the upper edges of a plurality of bins B. In the exemplary embodiment, the tie-down frame 35 is disposed along the upper edges of six entire bins B and is partially disposed along upper edges of two partial bins B. There are, in the exemplary embodiment, two bins in each transverse row.

The tie-down frame 35 comprises longitudinally extending, transversely spaced, rigid metallic parallel members 38 and 39. The longitudinal members 38 and 39 are made of suitable material, such as iron, and preferably galvanized iron. At each end of the longitudinal members 38 and 39, respectively, are longitudinally spaced depending plates 41 and 42. The depending plates 41 and 42 are made of suitable material, such as iron, and preferably galvanized iron, in the preferred embodiment, and are fixed to the longitudinal members 38 and 39 by suitable means, such as welding. The longitudindal members 38 and 39 engage the outboard upper end edges of the bins B to hold the bins B in a fixed position against transverse movement relative to the flatbed 26.

The tie-down frame 35 also comprises transversely extending, longitudinally spaced, rigid metallic members 45-48 which are also made of suitable material, such as iron and preferably galvanized iron, and which are fixedly secured to the longitudinal members 38 and 39 in a suitable manner, such as by welding or the like.

The longitudinal members 38 and 39 are right angular in form so as to seat along the outboard upper end edges of the bins B to prevent transverse movement of the bins B along the flatbed 26. The transverse end members 45 and 48 are right angular in form and seat along the upper outboard side edges of the outboard transverse bins B to prevent lifting or longitudinal movement of the bins B along the flatbed 26. When thrust is applied to the bins B from the movement of the railroad car or truck, there is a tendency for the bins B to rock or pivot against an associated stop 30, which results in a rotational or lifting movement, as well as a shifting movement unless restrained by the tie-down frame 35.

The transverse members 46 and 47 are in the exemplary embodiment, channel-shaped in form. Not only do the channel-shaped transverse members 46 and 47 serve to rigidify the tie-down frame 35, but also serve as support members for the tie-down frame 35 then the tie-down frame 35 is moved from one place to another. The channel-shaped transverse members 46 and 47 are configured to receive the tines of a fork lift truck so that the fork lift truck can haul the frame 35 from place-to-place. While reference herein is made to channel-shaped members to receive the tines of a fork lift truck, it is to be understood that the members 46 and 47 may be constructed or configured in various other well-known ways to receive the tines of a fork lift truck.

Depending from the longitudinal members 38 and 39, respectively, below the transverse channel-shaped members 46 and 47, respectively, are right angle bin retaining members 50-53 (FIGS. 2, 3 and 5). The bin retaining members 50-53 are made of suitable material, such as iron, and preferably galvanized iron, and are suitably fixed to the longitudinal members 38 and 39 by welding or the like. The right angle bin retaining members 50 and 51 are fixedly secured to the longitudinal member 38 in longitudinally spaced relation. The right angle bin retaining members 52 and 53 are fixedly secured to the longitudinal member 39 in longitudinally spaced relation. The right angle bin retaining members 50 and 53 are aligned transversely and the right angle bin retaining members 51 and 52 are aligned transversely. The bin retaining members 50-53, respectively, engage the upper side edges at the upper outboard corners of the intermediate bins B disposed on the flatbed 26. The bin retaining members 50-53 serve to prevent longitudinal movement of the bins B along the flatbed 26.

T-shaped spacers 54-57 (FIGS. 3-5) are fixedly secured to and depend from the transversely extending members 45-48. The horizontal arms of the T-shaped spacers 54-57 are suitably secured, such as by welding, to the under surfaces, respectively of the transversely extending members 45-48. The vertical leg of the T-shaped spacers 54-57 project between transversely aligned associated adjacent bins to provide a spacer member therebetween.

In the preferred embodiment, as shown in FIGS. 2 and 3, the frame 35 includes the longitudinally extending members 38 and 39 that extend along the entire upper end edges of a group of six bins B and partially along upper edges of two bins B of an adjacent group of bins B. The frame 35 also includes transversely extending members 45-48. The transversely extending member 45 extends along the upper outboard side edges of one end set of two bins B of the group of six bins B and the transversely extending member 48 extends along the upper outboard side edges of the opposite end set of two bins B of the group of six bins B.

For securing the tie-down frame 35 to the flatbed 26 and thereby securing the bins B to the flatbed 26, the tie-down cables or chains 60–63 (FIGS. 2–4) are employed. The tie-down cables or chains 60 and 61 are spaced longitudinally along one side of the flatbed 26 and extend upwardly and in the transverse direction relative to the tie-down frame 35. The tie-down cables 62 and 63 are spaced longitudinally along the opposite side of the flatbed 26 and extend upwardly and in the transverse direction relative to the tie-down frame 35. The cables 60 and 63 are aligned transversely relative to the tie-down frame 35 and the cables 61 and 62 are aligned transversely relative to the tie-down frame 35.

Spaced longitudinally along one side of the flatbed 26 and projecting laterally outward therefrom are well-known and conventional winches 65 and 66. Spaced longitudinally along the other side of the flatbed 26 and projecting laterally outward therefrom are well-known and conventional winches 67 and 68. The winches 65 and 67 are aligned transversely and the winches 66 and 68 are aligned transversely. The winches 65–68 are fixedly positioned relative to the flatbed 26 and are mounted for rotation through suitable brackets 70–73.

Disposed above the winches 65–68, respectively, are rods, rubbing plates or rollers 75–78, which are mounted on the flatbed 26 (FIGS. 2–4). The rubbing plates 75–78 are fixedly located relative to the flatbed 26. Only the brackets 81 and 83 are shown (FIG. 4). Disposed above the winches 65–68 are in transverse alignment with the winches 65–68, respectively, are spring-loaded frame couplers 90–93 FIGS. 2–4). The frame couplers 90–91 are fixedly mounted on the longitudinal member 38 in spaced, longitudinal relation and the frame couplers 92 and 93 are fixedly mounted on the longitudinal member 39 in spaced longitudinal relation.

Each frame coupler of the frame couplers 90–93 comprises a suitable plate 94 (FIG. 6) fixed to the associated end transverse member, such as the end transverse member 45. A cylindrical guide 95 is fixed to the plate 94 by suitable means, such as welding. A threaded rod 96 is received by the cylindrical guide 95. Surrounding the threaded rod 96 is an energy-absorbing compression spring 97. Seated on the compression spring 97 is a cap 98. At the bottom of the threaded rod 96 is a suitable loop 100, which receives one end of a cable or chain, such as the cable 60. A nut 98a in threaded engagement with the rod 96 releasably secures the frame coupler 90 as an assembled unit.

The other end of the cables 60–63 are trained respectively about the rubbing plates 75–78 and the winches 65–68. By operating the winches 65–68, the cables 60–63, respectively, are tightened to draw the tie-down frame 35 firmly against the bins B for securing the bins B to the flatbed 26. By operating the winches 65–68 in a reverse manner, the cables 60–63 are loosened to enable the bins B to be removed from the flatbed 26.

Illustrated in FIG. 7 is a modification of the spring frame coupler 90 shown in FIG. 6 in that the cable 60 has a wire rope end 60a, instead of a chain link and a swagged coupler 100a secures the wire rope end 60a to the spring frame coupler 90.

Illustrated in FIG. 8 is a cable arrangement 101 which may be used for securing the end bins B to the flatbed 26. There are two cable arrangements 101. Each cable arrangement 101 is disposed transversely relative to the flatbed 26. There is a cable arrangement 101 at each end of the railroad car or truck. The cable arrangements are disposed in parallel arrangement.

Each cable arrangement 101 comprises conventional and well-known winches attached to the flatbed 26 in transverse alignment. Only the winch 101' is shown. Brackets 102 (only one being shown) fixedly position the winches, respectively, to the flatbed 26. Trained about the roller of the winch 101' is one end of a cable 103. Trained about the roller of the winch (not shown) in transverse alignment with the winch 101' is one end of a cable 104. The cables 103 and 104, in the exemplary embodiment are well-known wire ropes.

Projecting outboard from the side of the tie-down frame 35 above the winch 101' is a cable guiding assembly 105 about which the cable 103 is trained. The cable guiding assembly 105 comprises an angle member 106 that is secured to the bulkhead of the railroad flat car 27 through an arm 107. Secured to the arm 107 by means of a nut and bolt is the member 106. The arm 107 is disposed at a selected angle from a horizontal plane to accommodate the height of the bins to which the cable is engaged. The lower end of the arm 107 is welded to a right angle member 108. The right angle member 108 is secured, as by welding, to the bulkhead of the railroad car 27.

At the upper section of the arm 107 is a rubbing plate 110 about which the cable 103 is trained. One end of the cable 103 is trained about the winch 101' and the other end of the cable 103 is formed with a banded loop 109. In the exemplary embodiment, the cable 103 is a well-known wire rope. The loop 109 is received by a tapered, generally U-shaped rod 111 of an isolator assembly 115 (FIGS. 8 and 8A).

Projecting outboard from the opposite side of the railroad car 27 above the winch in transverse alignment with the winch 101 is a cable guiding assembly 120 about which the cable 104 is trained. The cable guiding assembly 120 comprises an angle member 121 that is secured to the bulkhead of the railroad flat car 27 via an arm 122. Secured to the arm 122 by means of a nut and bolt is the angle member 121. The arm 122 is disposed at a selected angle from a horizontal plane to accommodate the height of the bins to which the cable is engaged. The lower end of the arm 122 is bolted to a right angle member 123. The right angle member 123 is secured, as by welding, to the bulkhead of the railroad car 27.

At the upper section of the arm 122 is a rod, rubbing plate or roller 125 about which the cable 104 is trained. One end of the cable 104 is trained about the winch in transverse alignment with the winch 101' and the other end of the cable 104 is loop coupled to a U-shaped rod 131 of the isolator assembly 115 (FIGS. 8 and 8A). The U-shaped rod 131 is welded to a bolt 133. In turn, the bolt 133 is received by aligned openings in axially spaced cylindrical members 134 and 135. The cylindrical member 134, in turn, is welded to the generally U-shaped rod 111. A nut 136 is disposed in threaded engagement with the bolt 133. The nut 136 releasably secures the isolator assembly 115 as an assembled unit. The cylindrical member 135 has free movement in the axial direction.

A spring 140 continuously urge the members 134 and 135 away from one another to maintain a self-adjusting tautness in the cables 104 and 103.

Illustrated in FIG. 9 is a modification of the tie-down frame 35. As shown in connection with the channel members 46 and 47, inverted channel plates 145 and 146 are mounted in transversely spaced relation to the channel members 46 and 47 to accommodate and facilitate the use of tines of a fork lift truck for moving the tie-down frame 35 from place-to-place.

What is claimed is:

1. An arrangement for securing a plurality of bins to a deck of a vehicle comprising:
   (a) a tie-down frame disposed along the top of the bins, said tie-down frame comprising a plurality of longitudinally extending, transversely spaced members for engaging the upper ends of said bins to prevent movement of said bins along said deck, and a plurality of transversely extending, longitudinally spaced members interconnected with said longitudinally extending members for engaging the upper sides of said bins to prevent movement of said bins along said deck; and
   (b) cable securing means at each end of said tie-down frame directed in the transverse direction for releasably securing said tie-down frame to said deck,
   (c) said longitudinally extending members being right angle members for engaging the outboard upper end edges of confronting bins, and said transversely extending members being right angle members for engaging upper side edges of confronting bins.

2. An arragement for securing a plurality of bins to a deck of a vehicle as claimed in claim 1 wherein said transversely extending members are outboard transversely extending members, said frame further comprising intermediate transversely extending members interconnected with said longitudinally extending right angle members, said outboard transversely extending members being arranged to engage the outboard upper side edges of confronting bins, said intermediate transversely extending members being arranged to engage the upper side edges of confronting bins between said outboard upper side edges.

3. An arrangement for securing a plurality of bins to a deck of a vehicle as claimed in claim 1 wherein said tie-down frame further comprises transversely extending, longitudinally spaced members fixed to said longitudinally extending members and constructed to receive tines of a fork lift truck for moving said tie-down frame from place-to-place.

4. An arrangement for securing a plurality of bins to a deck of a vehicle as claimed in claim 2 wherein said intermediate transversely extending members being longitudinally spaced and being constructed to receive tines of a fork lift truck for moving said tie-down frame from place-to-place.

5. An arrangement for securing a plurality of bins to a deck of a vehicle as claimed in claim 1 wherein said tie-down frame includes a plurality of frame and cable couplers fixedly positioned thereon and to which said cable securing means are attached, respectively, for releasably securing said tie-down frame to said deck.

6. An arrangement for securing a plurality of bins to a deck of a vehicle as claimed in claim 2 wherein said tie-down frame includes a plurality of frame and cable couplers fixedly positioned at the ends of said outboard transversely extending members, respectively, and to which said cable securing means are attached, respectively, for releasably securing said tie-down frame to said deck.

7. An arrangement for securing a plurality of bins to a deck of a vehicle as claimed in claim 5 wherein each of said frame and cable couplers includes a compression spring for the absorption of energy.

8. An arrangement for securing a plurality of bins to a deck of a vehicle as claimed in claim 6 wherein each of said frame and cable couplers includes a compression spring for the absorption of energy.

9. A tie-down frame for securing a plurality of bins to a deck of a vehicle comprising:
   (a) a plurality of longitudinally extending, transversely spaced members for engaging the upper ends of bins to prevent displacement movement of the bins along a deck of a vehicle; and
   (b) a plurality of transversely extending, longitudinally spaced members interconnecting with said longitudinally extending members for engaging the upper sides of bins to revent displacement movement of the bins along the deck of the vehicle,
   (c) said longitudinally extending members being right angle members for engaging the outboard upper end edges of confronting bins, and said transversely extending members being right angle members for engaging upper side edges of confronting bins.

10. A tie-down frame as claimed in claim 9 wherein said transversely extending members are outboard transversely extending members, said frame further comprising intermediate transversely extending members interconnected with said longitudinally extending right angle members, said outboard transversely extending members being arranged to engage the outboard upper side edges of confronting bins, said intermediate transversely extending members being arranged to engage the upper side edges of confronting bins, said intermediate transversely extending members being arranged to engage the upper side edges of confronting bins between the outboard upper side edges.

11. A tie-down frame as claimed in claim 9 and further comprising transversely extending, longitudinally spaced members fixed to said longitudinally extending members and constructed to receive tines of a fork lift truck for moving the tie-down frame.

12. A tie-down frame as claimed in claim 10 wherein said intermediate transversely extending members being longitudinally spaced and being constructed to receive tines of a fork lift truck for moving the tie-down frame.

13. A tie-down frame as claimed in claim 9 and further comprising a plurality of frame and cable couplers fixedly positioned thereon and arranged for cables to be attached thereto, respectively.

14. A tie-down frame as claimed in claim 10 and comprising a plurality of frame and cable couplers fixedly positioned at the ends of said outboard transversely extending members, respectively, and arranged for cables to be attached thereto, respectively.

* * * * *